(12) United States Patent
Finder

(10) Patent No.: US 6,313,200 B1
(45) Date of Patent: Nov. 6, 2001

(54) PROCESS FOR FEEDING ADDITIVES INTO A POLYMER MELT STREAM

(75) Inventor: Horst Finder, Rodgau (DE)

(73) Assignee: Lurgi Zimmer AktienGesellschaft, Frankfurt am Maim (DE)

(*) Notice: Subject to any disclaimer, the term of this patent is extended or adjusted under 35 U.S.C. 154(b) by 0 days.

(21) Appl. No.: 09/353,094

(22) Filed: Jul. 14, 1999

(30) Foreign Application Priority Data

Sep. 10, 1998 (DE) .............................................. 198 41 376

(51) Int. Cl.⁷ ....................................................... C08K 3/00
(52) U.S. Cl. ................................................................ 523/343
(58) Field of Search ............................................... 523/343

(56) References Cited

U.S. PATENT DOCUMENTS 5,376,702  12/1994  Stibal et al. .

FOREIGN PATENT DOCUMENTS

| 30 38 580 | 6/1981 | (DE) . |
| 40 39 857 C2 | 4/1990 | (DE) . |
| 41 34 682 | 2/1995 | (DE) . |
| 532 988 B1 | 11/1995 | (EP) . |

OTHER PUBLICATIONS

Signer, Arno, (1992) *Plastverarbeiter*, 43, JG. NR. 11, with English translation.
Fourne, Franz, (1995) *Schmelzpinnanlagen*, 4.6, pp. 316–318, with English Translation.
Luckert et al., (1986) *Chemlefasern/Textillindustrie*, vol. 36, No. 88, pp. 24–29 with English Translation.

*Primary Examiner*—Edward J. Cain
(74) *Attorney, Agent, or Firm*—McDonnell Boehnen Hulbert & Berghoff

(57) ABSTRACT

The present invention provides a process for mixing additives into a polymer melt steam, wherein a substream is removed from the polymer melt stream, mixed with additives, and then fed back into the polymer melt stream. In this process, the unmixed substream is sent as a single substream or in a maximum number of n−1 additional substreams directly to one up to a maximum number (n−1) of pump gear wheels of a planet wheel pump with n pump gear wheels. The additives are simultaneously supplied directly without mixing to at least one pump gear wheel of the planet wheel pump, and the substream mixed with the additives is removed from the planet wheel pump centrally at the inlet of the planet wheel pump and fed into the polymer melt stream.

4 Claims, 1 Drawing Sheet

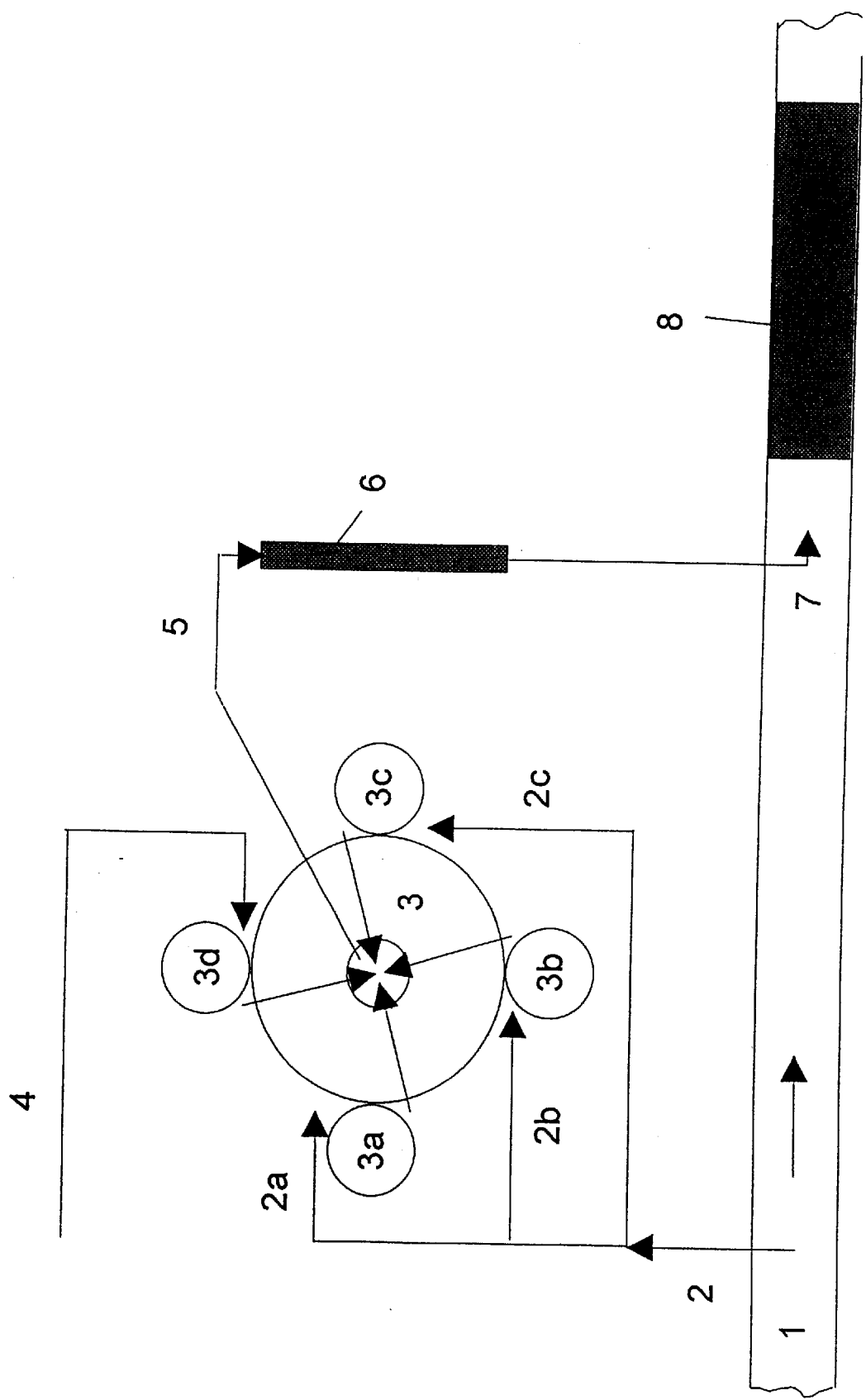

PROCESS FOR FEEDING ADDITIVES INTO A POLYMER MELT STREAM

BACKGROUND OF THE INVENTION

1. Field of the Invention

This invention concerns a process for feeding additives into a polymer melt stream, wherein a substream is taken from the polymer melt stream, mixed with additives, and thereafter supplied into the polymer melt stream again.

2. Summary of the Related Art

Feeding additives into a polymer melt stream is know. A process for feeding additives into a polymer melt stream is described in *Chemiefasern/Textilindustrie* [Manmade Fibers/Textile Industry], vol. 36/88, January 1986, pages 24 to 29, with a substream of approximately 5% to 10% being removed from an unmodified main melt stream discharged from a final reactor or extruder and sent through a twin screw extruder equipped with special kneading elements. Suitable additives are added to the twin-screw extruder with a continuous metering system and incorporated homogeneously into the melt. Then the melt loaded with additives is mixed back into the main melt stream, with a uniform distribution of additives being achieved by means of static mixing elements.

German Patent No. 4,039,857 describes a process and a device for direct continuous modification of polymer melts. A substream of melt, to be optionally modified, is taken from the main stream of melt and sent into a twin screw extruder. The additives pass through a delivery pump into the twin screw extruder. The modified melt substream is then sent back to the main melt stream.

European Patent No. 532,988 describes a process for producing random copolyesters. According to a preferred embodiment, a polyester (B) and 10 to 50 wt % of a polyester (A) are sent to a mixing extruder, and the extrudate is then mixed with the remaining 90 to 50 wt % of polyester (A) in a static mixer.

It is known from Franz Fourné, *Synthetische Fasern* [Synthetic Fibers], Hanser Verlag, 1995, pages 316 through 318, that planet wheel spinning pumps can be used to convey polymer melts. These planet wheel pumps usually have three to eight pump gear wheels arranged in one plane about a planet gear wheel that serves as the drive. The only melt inlet is in the form of a flow channel in the middle, and each of the n outlets is arranged in one gear wheel wedge.

SUMMARY OF THE INVENTION

The present invention comprises a process for feeding additives into a polymer melt stream, wherein a homogeneous premixing of additives and part of the polymer melt is achieved. This is ensured even when the additives have different Theological properties than the polymer melt.

According to the invention, a substream of a polymer melt stream is split off and directed to a planet wheel pump with n pump gear wheels. Before entering the planet wheel pump, the substream is optionally split into from 2 to n–1 substreams, which are each directed into a separate pump gear wheel. Additives are directed into from one to all of the remaining pump gear wheels. The additives and the substream(s) are mixed in the planet wheel pump and then directed back into the polymer melt stream.

Optionally, the substream/additive mixture is passed through a static mixer before returning to the polymer melt stream and/or the polymer melt stream is passed through a static mixer after the substream/additive mixture is added to it.

The foregoing merely summarizes certain aspects of the invention and is not intended, nor should it be construed to limit the invention, which is disclosed in more detail below. All patents and other publications, including priority document German Patent Application 198 41 376.9 are hereby incorporated by reference in their entirety.

BRIEF DESCRIPTION OF THE DRAWING

The FIGURE shows a simplified schematic flow chart of the process for feeding additives into a polymer melt stream.

DETAILED DESCRIPTION OF THE INVENTION

The present invention comprises a process for feeding additives into a polymer melt stream, whereby a homogeneous premixing of additives and part of the polymer melt is achieved. The process involves sending from one to a maximum of n–1 polymer melt substreams directly to from one to a maximum of n–1 pump gear wheels, respectively, of a planet wheel pump having n pump gear wheels, simultaneously sending the additives directly to at least one of the remaining pump gear wheels of the planet wheel pump where they are mixed with the polymer melt substream(s), removing the substream mixed with the additives from the planet wheel pump from the central inlet of the planet wheel pump, and introducing it into the polymer melt stream. The polymers used may be polyesters, polyamides, polyurethanes or polyolefins, for example. The additives used may be heat stabilizers, UV stabilizers, lubricants, copolymers, or color concentrates, for example. The number n may be from 2 to 10. The quantity of the substream diverted from the main polymer melt stream for mixing with the additives is usually 2% to 10% of the polymer melt stream. The substream mixed with the additives is removed from the inlet to the planet wheel pump. The planet wheel pump is thus operated from the outlets to the inlet, i.e., opposite the otherwise customary direction of flow. It has surprisingly been found that the additives are mixed well and homogeneously with the substream of the polymer melt stream at the outlet of the planet wheel pump.

It is possible to add various additives to the pump gear wheels of the planet wheel pump and introduce them homogeneously into the divided substream of the polymer melt stream. This is advantageously possible even when there are great differences in rheological properties between the various additives or between the additives on the one hand and the polymer melt on the other hand. The substream mixed with the additives is then sent back to the polymer melt stream, which can then be passed in an especially advantageous manner through a static mixer.

Relatively rapid homogeneous distribution of the additives in the polymer melt stream is achieved by the premixing of the additives with a substream of the polymer melt stream. Because of this premixing, it is also possible to select a relatively short mixing zone of a static mixer, which is optionally employed.

When the number of substreams is 2 or more, the substreams can be removed from the polymer melt simultaneously, as a single substream that is subsequently further divided before entering the planet wheel pump, or a combination thereof In a preferred embodiment of the present invention, the number n is from 3 to 8. Homogeneous mixing is achieved in a particularly advantageous manner according to the invention, especially when several additives are used, while maintaining a relatively minor the structural expense.

According to another preferred embodiment of this invention, the substream mixed with the additives is passed through a static mixer after coming out of the planet wheel pump and then is reintroduced into the polymer melt stream. As a result of this measure, the homogeneous mixing is increased in a relatively simple manner, which has an advantageous effect on the homogeneous introduction into the polymer melt stream.

According to another preferred embodiment of this invention, the additives fed to at least one of the pump gear wheels are supplied centrally to the axis of the inlet of the pump (exit of polymer stream) within the planet wheel pump at the point where they are combined with the polymer substreams. By this the homogeneous mixing takes place relatively rapidly in a short distance.

This invention is explained in further detail on the basis of the figure, which is illustrative of the present invention. Those skilled in the art will appreciate that variations on the scheme presented in the figure can be made without deviating from the scope of the invention.

The figure illustrates in a simplified diagram the process for feeding additives (4) into a polymer melt stream (1). A substream (2) is taken from the polymer melt stream (1) and divided into three additional substreams (2a, 2b, 2c). Each additional substream (2a, 2b, 2c) is sent to a pump gear wheel (3a, 3b, 3c) of a planet wheel pump (3). The planet wheel pump (3) has four pump gear wheels (3a, 3b, 3c, 3d). The additives (4) are sent to a pump gear wheel (3d). Homogeneous mixing of the additives (4) with the divided substream (2) takes place in the planet gear pump (3). The substream (5) mixed with the additives is removed centrally from the planet wheel pump (3) at the inlet (3f) of the planet wheel pump (3) and fed into the polymer melt stream (1). Before introducing the substream (5) mixed with the additives into the polymer melt stream (1), this substream (5) mixed with the additives is passed through a static mixer (6), which also has an advantageous effect on the homogeneous mixing. The substream (5) mixed with the additives (4) is introduced into the polymer melt stream (1) through a nozzle (7). Additional static mixers (8) support the homogeneous mixing of the substream (5) mixed with the additives into the polymer melt stream (1).

According to one variant of the process, it is possible to supply various additives (4) to two pump gear wheels (3c, 3d) and divide the substream (2) into just two additional substreams (2a, 2b). The divided substream (2) can be advantageously mixed homogeneously with two different additives (4) (not shown) at the same time.

What is claimed is:

1. A process for adding additives into a polymer melt stream, the process comprising
    a) removing from 1 to n−1 substreams from the polymer melt stream,
    b) directing the substream or substreams to from 1 to n−1 pump gear wheels of a planet wheel pump with n pump gear wheels;
    c) mixing the substream(s) with additives supplied simultaneously and directly to at least one of the remaining pump gear wheels;
    d) removing the substream mixed with the additives from the planet wheel pump centrally at the inlet of the planet wheel pump; and
    e) adding the substream mixed with the additives to the polymer melt stream.

2. The process according to claim 1, wherein n is 3 to 8.

3. The process according to claim 1 wherein the substream mixed with the additives is passed through a static mixer downstream from the outlet of the planet wheel pump before introduction into the polymer melt stream.

4. The process according to claim 1 wherein the additives fed to at least one of the pump gear wheels are supplied centrally to the axis of the inlet of the pump within the planet wheel pump at the point where they are combined with the polymer substream(s).

* * * * *